United States Patent [19]

Collins et al.

[11] Patent Number: 4,765,577

[45] Date of Patent: Aug. 23, 1988

[54] PIPE SUPPORT SYSTEM

[75] Inventors: Seymour Collins; William F. McClellan, both of Vacaville, Calif.

[73] Assignee: Pipe Shields, Inc., Vacaville, Calif.

[21] Appl. No.: 14,856

[22] Filed: Feb. 13, 1987

[51] Int. Cl.[4] .............................................. F16L 3/00
[52] U.S. Cl. ...................................... 248/59; 248/49; 138/107
[58] Field of Search ........................ 248/59, 58, 62, 49, 248/60, 79, 48.1; 138/107

[56] References Cited

U.S. PATENT DOCUMENTS

| | | | |
|---|---|---|---|
| 280,111 | 6/1883 | Aldrich | 248/48.1 X |
| 849,132 | 4/1907 | Hook | 248/59 |
| 1,832,315 | 11/1931 | McNulty | 248/59 |
| 3,960,350 | 6/1976 | Tardoskegyi | 248/59 X |
| 4,019,706 | 4/1977 | Weiland | 248/58 X |
| 4,077,592 | 3/1978 | Forbes | 248/59 |
| 4,146,203 | 3/1979 | Williams | 248/62 |
| 4,403,758 | 9/1983 | Burt | 248/49 |
| 4,445,656 | 5/1984 | Leitch et al. | 248/49 |
| 4,516,750 | 5/1985 | Brunner | 248/58 |

Primary Examiner—Ramon O. Ramirez
Attorney, Agent, or Firm—Thomas E. Schatzel

[57] ABSTRACT

A substantially horizontal pipe is supported within a U-shaped trough made of sheet metal. The trough has spaced sides interconnected by a curved bottom that define a width and a depth. A plurality of supports have curved surfaces for accommodating and supporting the curved bottom of the trough. The trough spans between spaced supports and has sufficient rigidity to support the pipe without allowing undue pipe deflection. The trough sides are tied to prevent splaying. The trough can be made in longitudinal sections having interfitting ends. These interfitting ends can be sealed so that the trough provides secondary containment for leakage from the pipe. A gap can be left between longitudinal sections of the trough to accommodate a branch pipe, and an adjustable bridge interconnects the sections for transferring stresses therebetween.

14 Claims, 3 Drawing Sheets

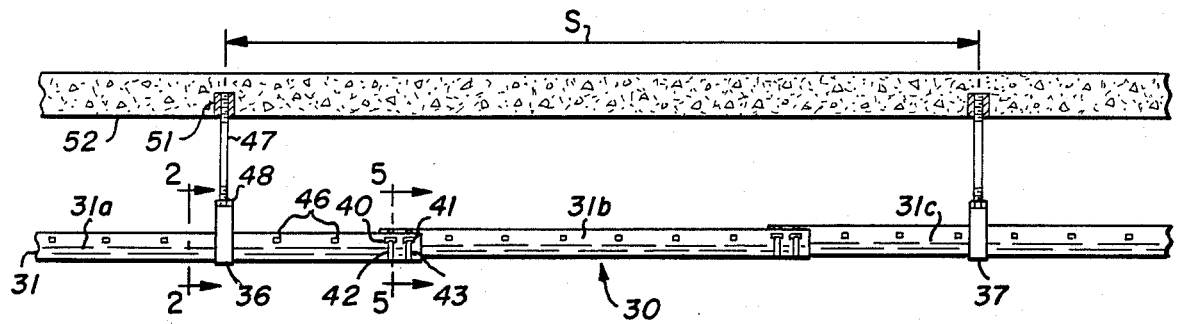
FIG_1
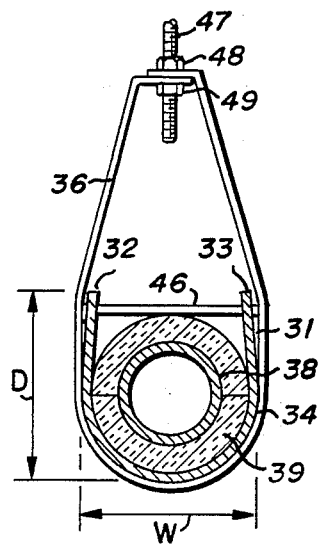
FIG_2
FIG_3
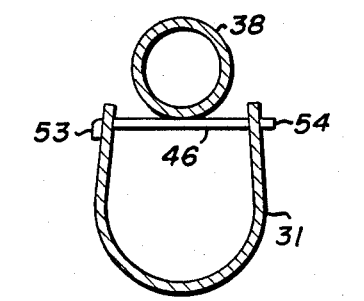
FIG_4
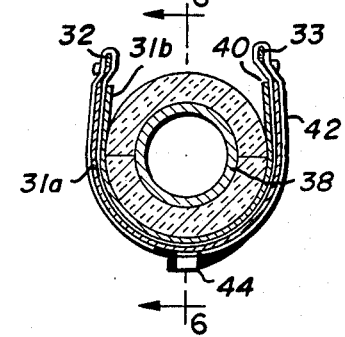
FIG_5
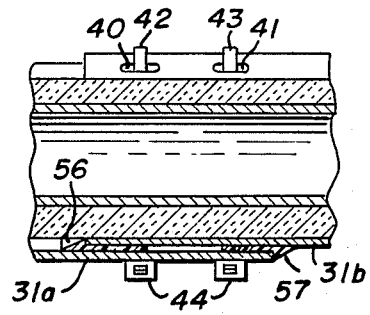
FIG_6
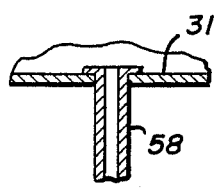
FIG_7
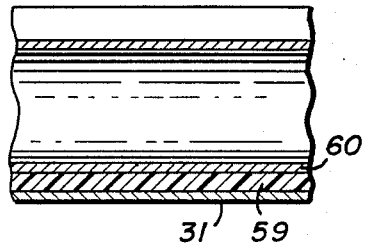
FIG_8
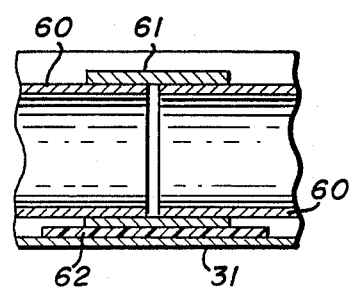
FIG_9

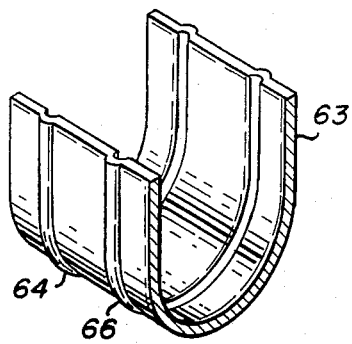
FIG_10
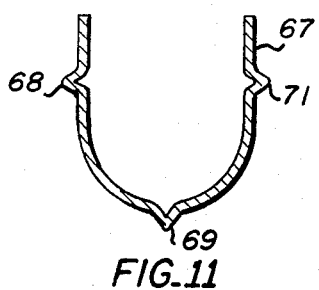
FIG_11
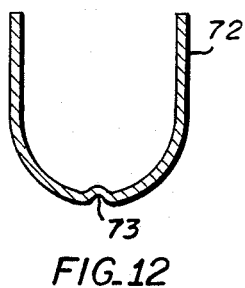
FIG_12
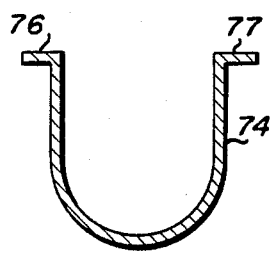
FIG_13
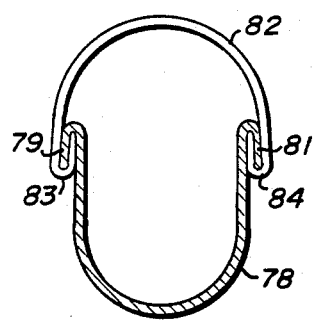
FIG_14
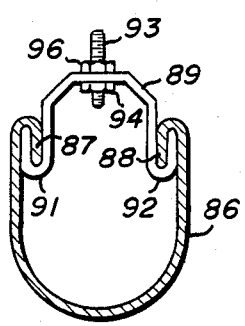
FIG_15
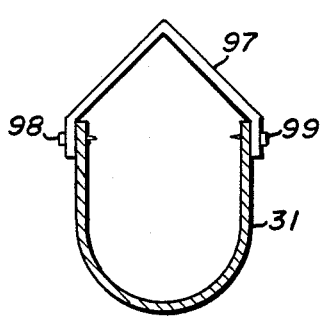
FIG_16
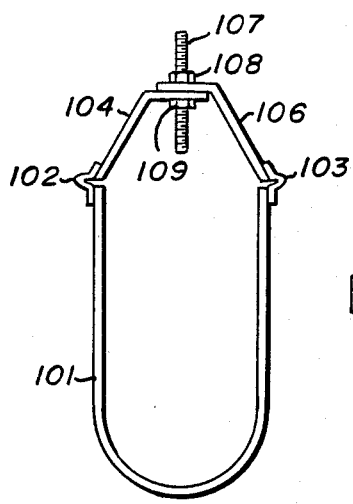
FIG_17
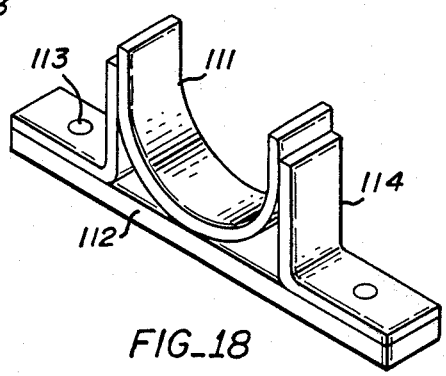
FIG_18
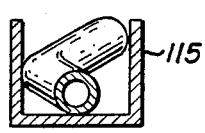
FIG_19

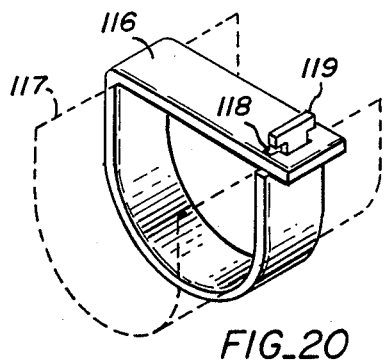
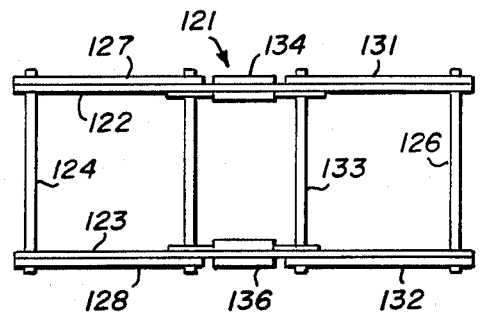
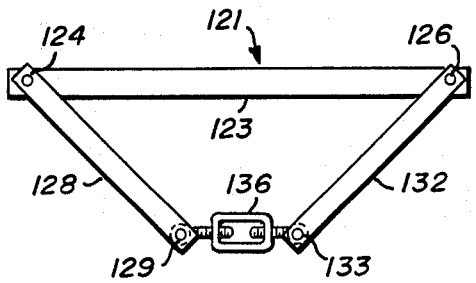
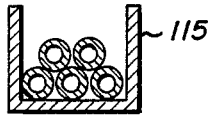
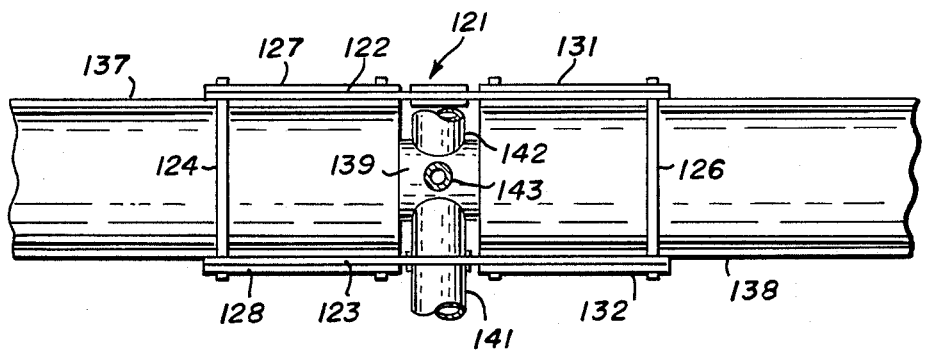
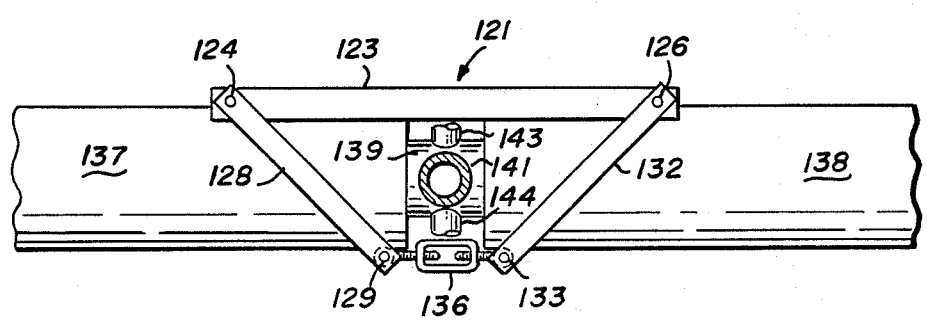

PIPE SUPPORT SYSTEM

BACKGROUND OF THE INVENTION

1. Field of the Invention

This invention relates to a pipe support system. More specifically, it concerns a system that provides vertical support for a horizontal pipe and that can provide secondary containment for leakage from the pipe.

2. Description of the Prior Art

When a small bore pipe is supported as a horizontal beam, the maximum spacing between vertical supports is often limited by considerations of excessive deflection, bending and shear stresses. The strength of pipe materials, such a plastics, further limit the support span, and for some plastic pipe compositions, a continuous support is necessary. In elevated temperature conditions, the strength and rigidity of the pipe can be seriously reduced. Small bore copper tubing requires a relatively short spacing between vertical supports.

In some installations of overhead pipe, secondary containment is required for the protection of personnel and/or equipment located beneath the pipe. A light weight sheet metal trough of semi-circular cross-section has been used to collect fluid and prevent dripping. These troughs lack the rigidity for supporting the pipe at maximum spacing between vertical supports.

V-shaped troughs have been used to provide support fo small bore pipe, but since these troughs are limited in depth, they do not have the section modulus needed for maximizing the support span. These troughs require a V-shaped hanger to interfit with the bottom of the trough. The hangers are expensive since they are made specifically for the troughs.

In a pipe support system, it is desirable to maximize the support span in order to reduce costs and to provide flexibility in design. The cost of a support includes not only the hanger or cradle hardware, but its installation in a structure. For example, it may be necessary to set threaded sleeves for receiving hanger rods in the framework for an overhead concrete slab before the concrete is poured. Cradles may require a support rack. These installation costs substantially increase the support cost. In an installation that requires numerous supports, by increasing the allowable support span, the total number of supports required can be reduced. Furthermore, it may be impossible to locate a support at a desired spacing because of an obstruction. In such a case, a support would be located on one side of the obstruction and if the support span was sufficient, the obstruction could be bridge. However, some pipe requires support every three feet and that may not be sufficient to bridge an obstruction.

SUMMARY OF THE PRESENT INVENTION

An object of the present invention is to reduce the total number of supports required or recommended for a piping installation under various building or industry codes by increasing the span between supports while minimizing pipe deflection and bending stress.

Another object of the invention is to provide secondary containment for leakage from a pipe.

A further object of the invention is to transfer stress between two trough sections separated by a gap which provides access for a branch connected to a main pipe extending longitudinally through the trough sections.

In accordance with the present invention, a substantially horizontal pipe is received by a U-shaped trough made of sheet metal and supported therein. The trough has a pair of spaced sides that define the trough width and a curved bottom that together with the sides define a trough depth. A plurality of spaced supports have curved surfaces for accommodating and supporting the curved bottom of the trough. The trough spans between the spaced supports and supports the pipe with rigidity sufficient to prevent undue deflection of the pipe.

In a preferred embodiment of the present invention, the trough sides are tied to prevent splaying and thereby maintain the shape of the trough and in particular, its resistance to bending. The trough can provide secondary containment for leakage from the pipe. The curved bottom of the trough has a semi-circular, cross-sectional shape that fits conventional pipe hangers. An adjustable bridge interconnects two trough sections for transferring stresses therebetween.

Advantages of the present invention include economy by reducing the total number of supports required or recommended for a piping installation under various building or industry code by providing greater rigidity to the pipe, thus allowing for substantial increase in hanger spacing, safety protection for personnel and equipment by providing secondary containment for leakage from a pipe, and structural stability by transferring stresses between two trough sections separated by a gap.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a side elevation view of a pipe support system embodying the present invention.

FIG. 2 is a section taken on the line 2—2 of FIG. 1.

FIG. 3 is a perspective view of a tie piece.

FIG. 4 is an installation view showing a pipe that is supported for hydrotesting.

FIG. 5 is a transverse section taken on the line 5—5 of FIG. 1.

FIG. 6 is a partial longitudinal section taken on line 6—6 of FIG. 5.

FIG. 7 is a detail view of a drainage downspout in a trough bottom.

FIG. 8 is a partial longitudinal section illustrating a sheet metal trough and a copper pipe separated by a dielectric isolator.

FIG. 9 illustates a pipe coupling supported in the trough by a dielectric isolator.

FIG. 10 is a perspective view of a modified trough section having circumferential beads.

FIG. 11 is a transverse section of a modified trough having longitudinal crimps.

FIG. 12 is a transverse section of a modified trough having a longitudinal dimple for rigidity.

FIG. 13 is a transverse section of a modified trough having outstanding flanges for rigidity.

FIG. 14 is a transverse section of a modified trough having side edges folded to hook outwardly of the trough sides and a spring clip that interlocks with the trough edges to hold the sides of the trough.

FIG. 15 is a transverse section of a modified trough having side edges folded to hook inwardly of the trough sides and a spring clip that interlock with the trough edges and that can be attached to a hanger rod.

FIG. 16 is a transverse section of a trough having a weather cover for outdoor installations.

FIG. 17 is an end view of a modified pipe hanger having hinged flaps attached to the tops of the sides.

FIG. 18 is a perspective view of a cradle for supporting a trough section.

FIG. 19 is a transverse section of a modified trough having a channel shape substantially larger than the pipe diameter.

FIG. 20 is a perspective view of a band that fits about a trough, indicated in phantom line.

FIG. 21 is a transverse sections of a trough having a channel shape used for supporting multiple pipes.

FIG. 22 is a plan view of a bridge for coupling two trough sections together.

FIG. 23 is a side elevation view of the bridge shown in FIG. 22.

FIG. 24 is a plan view of the bridge installed on trough sections holding an insulated pipe with a T-section.

FIG. 25 is a side elevation view of the bridge and trough sections shown in FIG. 24.

DESCRIPTION OF THE PREFERRED EMBODIMENTS

With reference to FIG. 1, there is illustrated a pipe support system indicated by the general reference numeral 30. This system includes a trough 31 formed by longitudinal sections 31a, 31b and 31c. Each trough section has a generally U-shaped, cross-sectional configuration, as illustrated in FIG. 2, and is made of sheet metal. The trough 31 has a pair of spaced sides 32 and 33 that define a trough width W. A curved bottom 34 that together with the sides 32 and 33 define the trough depth D. Looking again at FIG. 1, the trough 31 is supported by the supports 36 and 37 that are spaced apart by a span length S. While only one span length has been shown, it will be understood that the trough 31 is a continuous beam passing over numerous supports in a piping installation. A pipe 38 (FIG. 2) enclosed within insulation 39 fits within and is supported by the trough 31 which has sufficient rigidity to prevent undue deflection of the pipe.

The trough sections 31a, 31b and 31c have swaged ends to interfit as shown in FIGS. 1, 5 and 6. A pair of slots 40 and 41 are provided near the top of each trough side 32 and 33 at the ends of the trough sections. These sections are bound together by steel straps 42 and 43. As shown in FIG. 5, the steel strap 42 fits about the outside of the trough section 31b and passes inwardly of the section through the slots 40. Strap 42 passes outwardly over the tops of sides 32 and 33, then downwardly and outwardly through the slots 40 in the trough section 31a and about the outside of section 31a to where the free ends of the strap overlap and are locked in place by a strap fastener 44.

Looking again at FIG. 2, a tie piece 46 extends transversely of the trough 31 through slots in the side walls 32 and 33. The tie piece 46 is made of sheet metal and the ends are bent downwardly to prevent the side walls 32 and 33 from splaying. As shown in FIG. 1, tie pieces 46 are provided at uniform intervals along the trough. The support 36 (FIG. 2) is an elongated hanger strap with a bottom curved to fit the trough bottom 34 and with overlapping ends that are fastened to a hanger rod 47 by nuts 48 and 49 threadedly fitted on the rod. By adjusting these nuts, the support 36 can be raised or lowered. As shown in FIG. 1, the opposite end of the hanger rod is threadedly fitted into a sleeve 51 embedded in an overhead concrete slab 52.

Installation of the pipe support system 30 begins with setting sleeves 51 in the overhead concrete slab framework before the concrete is poured. After the concrete slab 52 has set, the hanger rods 47 are threaded into the sleeves and the supports 36 and 37 are fastened to the hanger rods. Trough sections 31a, 31b and 31c are fitted and strapped together. Tie pieces 46 having a bent end 53 and an outstanding end 54, as shown in FIG. 3, are inserted through the tie slots in the sides of the trough 31, as shown in FIG. 4. The pipe 38 is then installed and supported on top of the tie pieces for hydrotesting. Upon completion of hydrotesting, insulation 39 in semicircular sections is fitted about the pipe 38 between the tie pieces. The pipe can be supported by hand or by a come-along while the tie pieces 46 are removed. The trough 31 is raised to a proper height fitting about the insulated pipe, as shown in FIG. 2. Insulation can be filled in at locations where the tie pieces were formerly located. Then the tie pieces can be reinserted, and the outstanding end 54 is bent downwardly corresponding to the bent end 53. Thus, the tie pieces hold the side walls 32 and 33 to prevent splaying and to maintain the strength and rigidity of the trough 31.

Some installations require secondary containment for pipe leakage in order to protect personnel or equipment beneath the pipe. For example, acid may be carried by the pipe or even a water pipe over electrical equipment could be a hazard. The trough 31 can provide secondary containment if a masking sealant or some positive sealant is used to seal the overlapping ends of the trough sections. As shown in FIG. 6, a sealant 56 is applied to the inside joint between trough sections 31a and 31b, while a sealant 57 is applied to the outside joint. With secondary containment, it is necessary to provide for drains at desired locations. Such drains can be a simple drain hole in the trough 31 or a downspout 58, as shown in FIG. 7, leading to an appropriate collector. An alarm system including an electrical wire can be placed in the bottom of the trough 31 to detect pipe leakage and to determine the location of the leak.

Since the trough 31 is made of galvanized sheet metal, contact with dissimilar metal such as copper must be avoided. FIG. 8 shows a dielectric support 59 at the bottom of the trough 31 for supporting a copper tubing 60. The dielectric support can be made of neoprene or felt. FIG. 9 shows two copper tubing sections 60 joined together by a coupling 61 that is supported by a dielectric pad 62 at the bottom of trough 31.

FIG. 10 shows a modified trough 63 having a pair of beads 64 and 66 that extend circumferentially about the curved bottom of the trough. These beads provide ridigity against splaying for the trough section and prevent the trough from sliding longitudinally within a support hanger. A modified trough 67, shown in FIG. 11, has a side crimp 68, a bottom crimp 69 and a side crimp 71 that extend longitudinally of the trough section to provide rigidity against lateral and vertical deflection. A modified trough 72, shown in FIG. 12, has a dimple 73 that extends longitudinally of the trough bottom. This dimple provides rigidity against vertical deflection for the trough section. Both the bottom crimp 69 and the bottom dimple 73 provide space for drainage in the bottoms of the troughs.

A modified trough 74 shown in FIG. 13, has outstanding flanges 76 and 77 that provide lateral stability for the trough. A modified trough 78, shown in FIG. 14, has edges 79 and 81 folded outwardly and downwardly to partially overlap the sides of the trough. A sping clip 82 has end hooks 83 and 84 that interlock with the folded edges 79 and 81. The spring clip prevents splaying of the trough 78 and can be slid longitudinally of the trough for repositioning.

Looking now at FIG. 15, a modified trough 86 has edges 87 and 88 folded inwardly and downwardly to partially overlap the trough sides. A spring clip 89 has end hooks 91 and 92 that interlock with the folded edges 87 and 88. This spring clip maintains the shape of the trough section and can also be used as a hanger when a hanger rod 93 is adjustably attached thereto by nuts 94 and 96. The spring clip can be slid longitudinally of the trough for repositioning.

With reference to FIG. 16, a conventional trough 31 is shown with a weather cap 97 attached thereto by sheet metal screws 98 and 99. The weather cap has an inverted V-shape similar to a high pitched roof and is used for outdoor installation where run-off of rain and snow is a concern. An elongated hanger 101, shown in FIG. 17, has sufficient internal depth for receiving the trough, installing the pipe and mounting the weather cap without interference. Hinges 102 and 103 connect the hanger sides with overlapping top flaps 104 and 106. A hanger rod 107 can be adjustably connected to the overlapping top flaps by nuts 108 and 109.

A cradle 111, shown in FIG. 18, provides an alternate form of trough support that is used when mounting a trough on a base. The cradle has a curved surface to fit the semi-circular bottom of a trough. The cradle rests upon a base 112 and is supported laterally by angular end pieces 113 and 114. The base is mounted on a rack at a piping installation, and the cradle provides both vertical and lateral support for a trough.

A modified trough 115, shown in FIG. 19, has a channel section with a flat bottom that is substantially wider than the diameter of pipe supported therein. This arrangement is useful for pipe subject to considerable expansion such a plastic pipe carrying fluids at very high temperature. At normal temperature, the pipe will lay in a straight line on the bottom of the trough, but when carrying high temperature fluid, it will expand longitudinally and bend like a snake both horizontally and vertically. The trough provides both vertical and horizontal support for the pipe that is very flexible at high temperatures. This same trough 115 can be used to support multiple pipes in a nested fashion as shown in FIG. 21.

A one-piece strap 116, shown in FIG. 20, can be used to prevent a trough 117, shown in phantom line, from splaying. The strap is made of sheet metal and is shaped to fit about the outside of the trough. A T-shaped slot 118 is provided near one end of the strap and a T-shaped locking tab 119 is provided at the other end of the strap. The locking tab is inserted through the wide portion of the T-shaped slot and resiliently moves to the narrow portion locking the strap in place. These straps do not require slots in the sides of the trough as did the tie pieces 46.

An accessory for the pipe support 30 is a bridge, indicated generally by reference numeral 121 in FIGS. 22–25. The bridge includes a pair of longitudinal side bars 122 and 123 that are interconnected at each end by transverse rods 124 and 126. A pair of diagonal bars 127 and 128 are mounted outside the side bars near the ends of rod 124, and the opposite ends of the diagonal bars are interconnected by a lower transverse rod 129. Diagonal bars 131 and 132 are mounted outside the side bars near the ends of rod 126, and the opposite ends of these diagonal bars are interconnected by a lower transverse rod 133. The lower transverse rods 129 and 133 are interconnected by turnbuckles 134 and 136.

As shown in FIGS. 24 and 25, the bridge 121 is used for coupling and transferring stress between trough sections 137 and 138 at midspan to eliminate the need for hangers at the ends of the trough sections. These trough sections carry an insulated main pipe 139 extending longitudinally thereof. It is necessary to provide a gap between the trough sections and in the main pipe insulation to accommodate branches 141 and 142 extending laterally from the main pipe and branches 143 and 144 extending vertically from the main pipe. The transverse rod 124 passes through the side walls of the trough section 137. The transverse rod 126 passes over the side walls of trough section 138 and lower transverse rod 133 passes under the trough section.

By tightening the turnbuckles 134 and 136, these turnbuckles are given a tension stress, the diagonals 127, 128, 131 and 132 are given a tension stress, and the longitudinal side bars 122 and 123 are placed in compression. The bridge 121 can be adjusted to put a camber in the beam formed by the bridge and the trough sections 137 and 138. Because of the desirable structional properties of the bridge, it may be used in situations where it is not required by a branch, but merely to provide more rigidity. For example, a desired span may be greater than allowable for a trough with a given section modulus. By inserting the bridge at midspan between trough sections and prestressing the combined structure by tightening the turnbuckles, the combined structure would have sufficient rigidity for the desired span.

Normally, the trough size is selected to fit the diameter of pipe to be supported. When the pipe is insulated, the trough size is increased to fit the insulation. However, an oversized trough can be used to provide greater structural strength and it can also be used to carry multiple pipes nested therein.

From the foregoing description, it will be seen that pipe 38 is supported in a U-shaped trough 31 made of sheet metal. The trough has spaced sides 32 and 33 that define the trough width W, and a curved bottom 34 that together with sides define the trough depth D. Spaced supports 36 and 37 have curved surfaces for accommodating and supporting the curved bottom of the trough. These supports are spaced by a span S and the trough extends therebetween. The pipe within the trough is supported by the trough with rigidity sufficient to prevent undue deflection of the pipe.

The trough sides 32 and 33 are prevented from splaying by the tie pieces 46. Trough sides can also be maintained in configuration by straps 116, spring clips 82 and 89, and weather cap 97. The rigidity of the trough sides can be increased with beads 64 and 66, crimps 68, 69 and 71, dimples 73, outstanding flanges 76 and 77, and folded edges 79, 81, 87 and 88. The trough 31 can provide secondary containment for leakage from the pipe 38. The curved bottom 34 of the trough has a semi-circular, cross-sectional shape that fits conventional pipe hangers. An adjustable bridge 121 interconnects trough sections 137 and 138 for transferring stresses therebetween.

Although the present invention has been described in terms of the presently preferred embodiments, it will be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe; and
a strap extending transversely about the trough, said strap having a T-shaped slot near one end and a T-shaped locking tab at the other end, said locking tab fitting within the slot to lock the strap in place thereby preventing splaying of trough sides and maintaining the trough shape.

2. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accomodating and supporting the curved bottom of the trough, said trough spanning between the spaced supports and supporting the pipe with ridigity sufficient to prevent undue deflection of the pipe wherein,
said trough sides have edges folded outwardly and downwardly, and a spring clip having end hooks for interlocking with the folded edges of the trough, said spring clip extending transversely of the trough above the pipe to prevent splaying and thereby maintaining the trough shape.

3. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe wherein,
said trough sides have edges folded inwardly and downwardly, and a spring clip having end hooks for interlocking with the folded edges of the trough, said spring clip extending transversely of the trough above the pipe to prevent splaying and thereby maintaining the trough shape.

4. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports wiht each suppport having a curved surface for accommodating and supporting the curved bottom of the trough, said trough spanning between the spaced supports and supporting the pipe with ridigity sufficient to prevent undue deflection of the pipe wherein,
a weather cap fastened to the trough sides and extending transversely therebetween above the pipe, said weather cap holding the trough sides to prevent splaying and having a pointed shape to enhance run-off of rain and snow.

5. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom for the trough, said trough spaning between the spaced supports and supporting the pipe with ridigity sufficient to prevent undue deflection of the pipe wherein,
said trough sides and cured bottom have a bead-like corrugation extending transversely thereabout.

6. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe wherein,
said trough has a plurality of crimps extending longitudinally thereof to provide rigidity against lateral and vertical deflection.

7. A system for supporting a substantially horizontal pipe, said system comprising:
a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accomodating and supporting the curved bottom of the trough, said trough spanning between the spaced supports and supporting the pipe with ridigity sufficient to prevent undue deflection of the pipe wherein,
said trough has a dimple extending longitudinally of the trough bottom to provide rigidity against vertical deflection of the trough.

8. A system for supporting a substantially horizontal pipe, said system comprising:

a U-shaped trough made of sheet metal for receiving a pipe, said trough having a pair of spaced sides that define the trough widths and a curved bottom that together with the sides define a trough depth, said rough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe wherein, said trough supports are elongated hanger supported above the trough.

9. The pipe support system of claim 8 wherein, said trough supports are elongated hangers having a pair of hingedly connected top flanges that can be positioned in overlapping relationship above the trough and connected to a hanger rod for overhead support.

10. A system for supporting a substantially horizontal pipe, said system comprising:

a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe wherein, said trough is formed by a plurality of longitudinal sections having interfitting ends that are bound together with steel straps.

11. The pipe support system of claim 10 wherein, said interfitting ends are sealed so that the trough can provide secondary containment for leakage from the pipe.

12. A system for supporting a substantially horizontal pipe, said system comprising:

a U-shaped trough made of sheet metal for receiving a pipe, said trough having a pair of spaced sides that define the trough widths and curved bottom that together with the sides define a trough depth, said trough depth being greater than the trough width, and a plurality of spaced supports with each support having a curved surface for accomodating and supporting the curved bottom of the trough, said trough spanning between the spaced supports and supporting the pipe with ridigity sufficient to prevent undue deflection of the pipe wherein, said trough has slots in opposite sides aligned transveresly of the trough, and a tie piece extending through the slots for supporting the pipe during hydrotesting, said tie piece being removable after hydrotesting the pipe to enable the trough to be raised about the pipe and reinsertable above the pipe where the tie piece can be deformed for maintaining the shape of the trough.

13. A system for supporting a substantially horizontal pipe, said system comprising:

a U-shaped trough made of sheet metal for receiving a pipe, said trough having a pair of spaced sides that define the trough widths and a curved bottom that together with the sides define a trough depth, said trough depth being greater than the trough width, and a plurality of spaced supports with each support having a curved surface for accommodating and supporting the curved bottom of the trough, said trough spanning between the spaced supports and supporting the pipe with ridigity sufficient to prevent undue deflection of the pipe wherein, said trough includes two longitudinal sections separated by a gap, and an adjustable bridge itnerconnecting the longitudinal sections of the trough for transferring stresses therebetween.

14. The pipe support system of claim 13 wherein, said adjustable bridge includes a transverse rod passing over the sides of one longitudinal section of the trough, another transverse rod passing over the sides of the other longitudinal section of the trough, a pair of side bars interconnecting the transverse rods for transferring compression stresses therebetween, a lower transverse rod passing beneath the bottom of one longitudinal section of the trough, another lower transverse rod passing beneath the bottom of the other longitudinal section of the trough, a pair of diagonal bars interconnecting the transverse rod and the lower transverse rod for each longitudinal section of the trough, and a pair of turnbuckles interconnecting the lower transverse rods for transferring tension stress therebetween.

* * * * *